E. Y. HASKELL.
NAVIGATOR'S DISTANCE AND BEARING TAKER.
APPLICATION FILED JUNE 27, 1916.
1,210,165.
Patented Dec. 26, 1916.
2 SHEETS—SHEET 2.
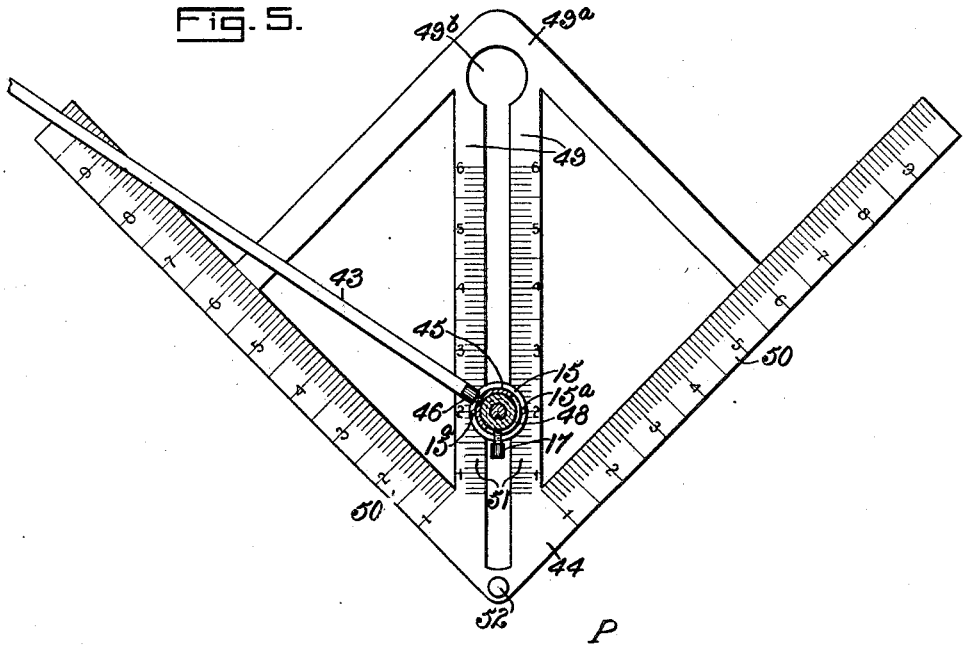
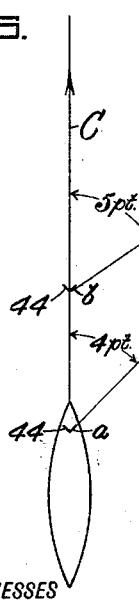
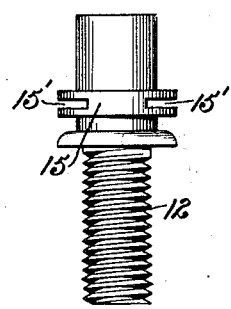
WITNESSES
INVENTOR
E. Y. Haskell
BY
ATTORNEYS

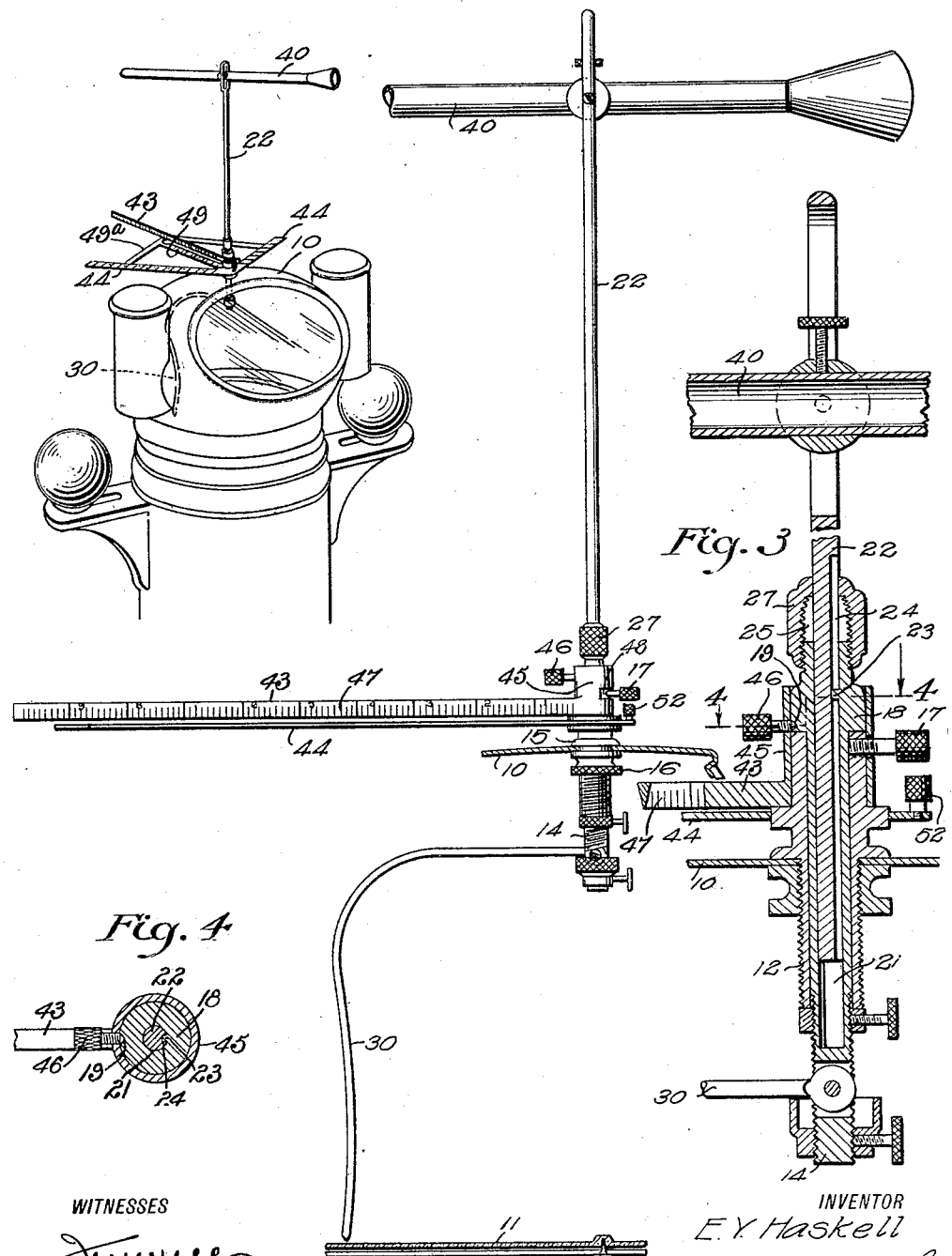

UNITED STATES PATENT OFFICE.

EDWARD Y. HASKELL, OF NEW LONDON, CONNECTICUT.

NAVIGATOR'S DISTANCE AND BEARING TAKER.

1,210,165.  Specification of Letters Patent.  Patented Dec. 26, 1916.

Application filed June 27, 1916. Serial No. 106,120.

*To all whom it may concern:*

Be it known that I, EDWARD Y. HASKELL, a citizen of the United States, and a resident of New London, in the county of New London and State of Connecticut, have invented a new and Improved Navigator's Distance and Bearing Taker, of which the following is a full, clear, and exact description.

The invention relates to nautical instruments and has particular reference to devices used particularly in connection with ships' binnacles for the purpose of observing distances and taking of bearings.

The present invention constitutes an improvement over the device shown in Letters Patent of the United States, issued to me on July 27, 1915, No. 1,148,380.

Among the distinct objects of the present improvement is to provide an attachment in connection with the bearing taker whereby the number of miles to distant objects from either bow of the ship may be noted while the ship is running.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a perspective view of the instrument complete, applied to the top of the canopy of a ship's binnacle; Fig. 2 is a fragmentary view of the binnacle and a side elevation of the principal parts of the attachment; Fig. 3 is a vertical sectional view of the main parts of the improvement; Fig. 4 is a horizontal section on the line 4—4 of Fig. 3; Fig. 5 is a plan view of the distance finding parts with the holding members therefor in cross section; Fig. 6 is a diagram indicating the manner of manipulating the distance taker; and Fig. 7 is a detail elevation of the sleeve described below.

For the purpose of illustrating the improvement, I show certain of the parts practically the same as in the patent above referred to, the same including the binnacle canopy 10 and compass dial 11. I also show a sleeve 12 fitted in the top of the canopy for the accommodation of a hollow spindle 14, to which the pointer 30 is pivotally and adjustably connected. The head of the sleeve 12 carries a set screw 17 adapted to bear against the spindle 14 and lock the spindle from rotation. The upper end of the spindle is provided with a head 18 having a depression or countersink 19 arranged in vertical alinement with the shank of the pointer 30. The spindle is provided with a smooth central bore 21, into which is telescopically fitted the vertical rod 22. Relative rotation between the rod and spindle is prevented by means of a lug 23 projecting into a groove 24 formed in the rod. The vertical adjustment of the rod is determined by a clutch thimble 27 gripping the split upper end 25 of the spindle upon the rod. The sighting tube 40 remains substantially the same as set forth in the patent and, as stated therein, is pivoted for movement around a horizontal axis in the upper end of the rod and the axis of the tube always lies in the same vertical plane as the pointer 30.

The navigator may readily indicate upon the compass dial 11 the bearing of any distant object or light that he may view through the sighting tube, making such indication permanent, if desired, by means of the set screw 17, since the sleeve 12 is secured rigidly to the binnacle canopy.

The instrument in its improved form is adapted especially for determining by little or no calculation, the distance of the ship from distant visible objects. The principal elements employed in this connection, are two members 43 and 44 which may be termed respectively the marking member and the distance member. The marking member consists mainly of a simple straight rod or arm graduated upon opposite sides and having its lower edge comparatively sharp for coöperation with one or the other of the right angularly arranged arms 50 of the angle or distance member. The marking member has a thimble 45 fitted around the head 18 of the spindle 14 and the upwardly extending flange of the sleeve 12. This thimble carries a set screw 46 coöperating with the depression 19 for locking the marking member to the spindle. The thimble, however, is provided with a slot 48 through which the screw 17 projects to provide for sufficient lateral swing of the marking member and pointer coincidentally with the swinging of the sighting tube. The distance member includes a pair of parallel graduated tongues 49 which together with the graduations on the arms 50 are operative from the neutral point or the point of intersection of the inner edges of the arms 50 in the center of the slot between the two tongues 49. The upper portion of the sleeve 12 is provided with a head 15 having on opposite sides a pair of slots 15' which receive the inner or adjacent edges of the tongues 49. These edges of the tongues just referred to are graduated at 51 and, as above indicated, the zero point of all these graduations is adapted to coincide with the verical axis of the rod 22 when the parts are at idle position or with the member 44 shoved forwardly as far as it can go. The front ends of the tongues are connected to each other and to the inner edges of the arms 50 by means of a web 49$^a$ which is provided with a hole 49$^b$ at the front end of the slot to permit the thimble 45 to pass through when the angle member 44 is drawn rearwardly as far as possible by grasping the finger piece 52.

By reference to the plan view of Fig. 5 and the diagram of Fig. 6, the method of determining the distance of an object ahead of the ship and on either bow thereof, may be briefly described as follows: With the ship sailing in a certain course as C and at a speed determinable directly from the log and with the distance member 43 set, as above described, in the vertical plane of the pointer and sighting tube, the navigator will swing the bearing taker including the pointer so as to indicate four points on the same bow as the object. The bearing taken will then be locked by the set screw 17. In this position the indicating or sharp edge of the marking member will substantially coincide with the inner graduated edge of the adjacent arm 50, both of the arms projecting outwardly always at four points on either bow. When the object comes within range of the sighting tube, the time will be noted which may be regarded as $a$. The bearing taker will then be loosened and adjusted around, say, at five points on the same bow, and again locked, the marking member being clamped in the same vertical plane as the pointer and bearing taker, following such adjustment. When the object is again sighted through the tube 40, the time will again be noted and which may be regarded as $b$. Given then the interval of time between $a$ and $b$ and the speed of the ship, the distance traveled during the interval between the two observations will immediately be known. The distance member 44 will then be drawn rearwardly until the scale 51 on either tongue 49 will indicate on such tongue the distance traveled between the two times of observation, an indicator pointer 15$^a$ on either side of the head 15 and arranged directly at right angles to the axis of the ship from the center of the bearing taker marking such distance over the scale. The marking member 43 will now intersect the graduated arm 50, and its scale 47 at the point of intersection will directly indicate the distance from the ship to the object at the time of the second observation, while the reading at the same time on the scale of the arm 50 will indicate the distance to the object from the ship at the original reading. In other words, the instrument when set as last described will represent a triangle whose angles will be determined by the neutral point or angle of intersection of the two arms of the member 44, the center of the rod 22, and the point of intersection of the arms 43 and 50. This triangle, furthermore, is precisely similar to the actual triangle including the ship's course on one side and having the following angles: First, the position of the ship at the time $a$, first reading, secondly, the position of the ship at the time $b$, second reading, and thirdly, the object indicated at P on the diagram. Since these triangles are similar, and the distance $a$ to $b$ is known and indicated on the same scale 51, it follows that the lengths of the other two sides of the triangle will be directly indicated by the intersecting scales of the arms 43 and 50 without calculation.

I claim:

1. In a device of the class set forth, the combination with a ship's binnacle and bearing taking devices mounted for movement around a vertical axis thereon, of a distance finder comprising an arm mounted upon the top of the binnacle and held at a definite angle with respect to the path of the ship but movable forwardly and backwardly, and a marking member journaled for movement around the axis of the bearing taker and adapted to intersect the aforesaid arm at a definite angle whereby the distance of the object will be determined according to the angular movement of the ship with respect to the object during a definite interval of time.

2. The combination with a ship's binnacle and a bearing taker mounted thereon including a vertical rod, of distance finding devices comprising a distance member held in a horizontal plane non-rotarily upon said rod but movable rearwardly in said plane, said distance member including a graduated tongue for determining the displacement of the distance member rearwardly and also including an arm extending at a definite angle laterally from the axis of the tongue, and a marking member journaled for rotation around the fixed axis of the bearing taker and adapted to intersect said arm at a definite angle according to the rearward displacement of the distance member.

3. In a device of the character set forth, the combination with a ship's binnacle and a bearing taker secured thereto and including a vertical axis, of distance finding devices mounted upon said axis, said latter devices including a distance member having two arms arranged at right angles to each other and a pair of tongues extending forwardly midway between said arms, said tongues being graduated forwardly from the point of intersection of the arms to indicate intervals of distance traveled by the ship, and a marking member fitted upon the axis aforesaid, said marking member having a graduated edge coöperating with either distance member arm to indicate directly the distance as determined by the extent of rearward adjustment of the distance member.

EDWARD Y. HASKELL.

Copies of this patent may be obtained for five cents each, by addressing the "Commissioner of Patents, Washington, D. C."